July 3, 1956
C. H. MacINTYRE
2,753,138
OPERATING MECHANISM FOR INFLATABLE
ICE ELIMINATING SYSTEM
Filed Nov. 19, 1952
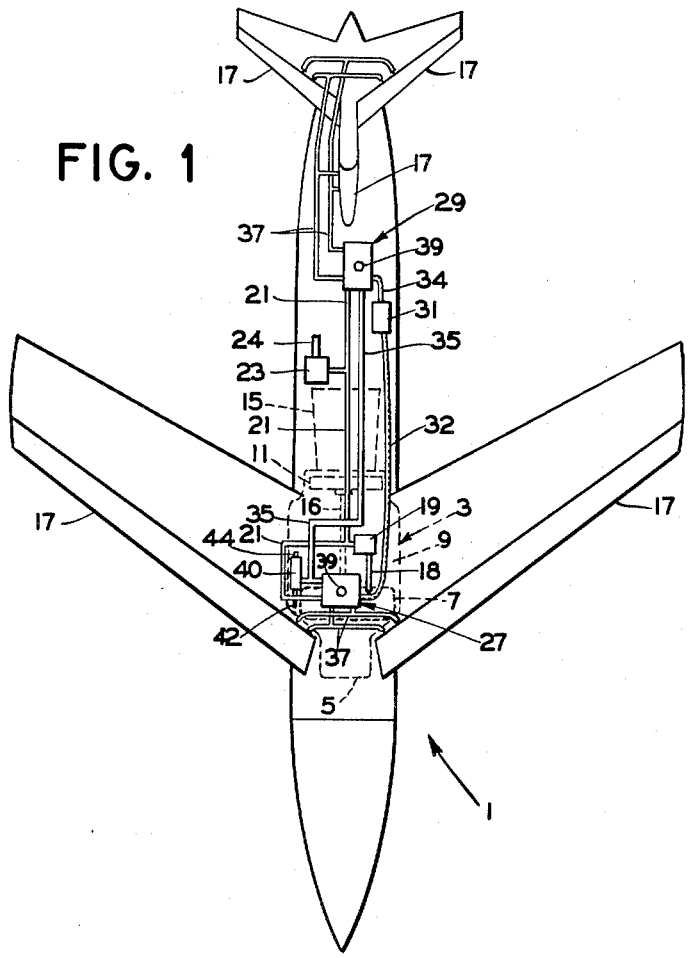
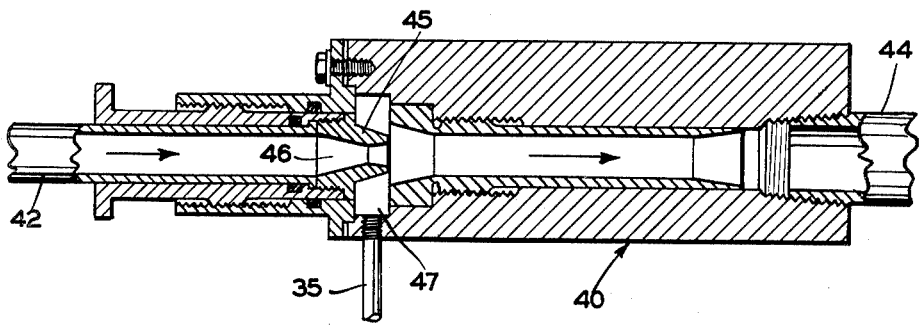
INVENTOR.
CHARLES H. MACINTYRE
BY
Herbert L. Davis
ATTORNEY

United States Patent Office 2,753,138
Patented July 3, 1956

2,753,138

OPERATING MECHANISM FOR INFLATABLE ICE ELIMINATING SYSTEM

Charles H. MacIntyre, Hasbrouck Heights, N. J., assignor to Bendix Aviation Corporation, Teterboro, N. J., a corporation of Delaware Application November 19, 1952, Serial No. 321,396

2 Claims. (Cl. 244—134)

The present application relates to an inflatable ice eliminating system for an aircraft or projectile having a turbo-jet engine and more particularly to a novel and improved system for providing inflating and deflating pressures for effecting operation of the ice eliminating elements of the system.

In a turbo-jet internal combustion engine of the type with which the subject invention is designed for use there may be provided a compressor supplying air under pressure to the combustion chambers of the engine and a turbine driven by combustion gases from these chambers for driving the compressor.

An object of the invention is to provide novel means for bleeding air under pressure from the compressor for inflating suitable elements of the ice eliminating system and for providing a source of suction or negative pressure for maintaining such elements in a normal deflated condition.

Another object of the invention is to provide in combination with an inflatable ice eliminating system novel means for providing a source of inflating ad deflating pressures for operating suitable boot elements of the system.

Another object of the invention is to provide in combination with an inflatable ice eliminating system novel means for effecting a source of negative pressure for the system, including an ejector operated by air under pressure from the compressor.

Another object of the invention is to utilize the air outlet pressure from the compressor of an aircraft engine to operate elements of an inflatable ice eliminating system and to combine in such a system an air ejector also operated by air under such outlet pressure for deflating such elements under negative pressure so as to thereby simplify the means for supplying such operating pressures to the system and eliminate additionl pressure and suction pumps heretofore provided for supplying inflating and deflating pressures to the elements of the system.

The above and other objects and features of the invention will appear more fully hereinafter from a consideration of the following description taken in connection with the accompanying drawings wherein one embodiment of the invention is illustrated by way of example.

In the drawings:

Figure 1 is a plan view of a typical aircraft or missile with which the subject invention is designed for use and showing diagrammatically the manner in which the air outlet pressure from the compressor of a turbo-jet engine in operatively connected into the inflatable ice eliminating system so as to effect positive and negative operating pressures for the inflatable elements of the system.

Figure 2 is a detail sectional view of an air ejector designed for use in the system of Figure 1 for providing a source of negative pressure to maintain the inflatable elements of the system normally in a deflated condition.

Referring to the drawing of Figure 1, there is shown an aircraft or missile indicated by the numeral 1 having a turbo-jet engine shown in dotted lines and indicated by the numeral 3. The turbo-jet engine may be of a conventional type having a ram air inlet 5 for a compressor 7 which in turn supplies the air under pressure to suitable combustion chambers 9 of the engine 3. The products of combustion from the chambers 9 are directed to a turbine 11 which in turn drives in a conventional manner through a shaft 16 the compressor 7 as shown in dotted lines. The gases from the combustion chamber 9 driving the turbine 11 are exhausted through a conduit 15 in a jet to propel the plane.

Inflatable elements or boots 17 are mounted along the leading edges of the plane, as shown diagrammatically in Figure 1, and may be of a type such as disclosed in U. S. Patent No. 2,515,519, granted July 18, 1950, to Donald M. Lawrence et al. and assigned to Bendix Aviation Corporation.

A conduit 18 bleeds air under pressure from the outlet of engine compressor 7 through a pressure throttling valve 19 of a conventional type to a pressure manifold 21 which supplies the air pressure for operation of the inflatable elements 17. The throttling valve 19 serves to maintain the air pressure in the entire manifold system 21 at a predetermined value of, for example, twenty-two p. s. i. g.

A safety valve 23 serves to relieve the system to atmosphere through a conduit 24 should the air pressure in the manifold 21 reach an excessive value of, for example, approximately twenty-fourth p. s. i. g. and is used as a safety device only. The pressure manifold 21 leads to suitable solenoid operated distributor valves 27 and 29 which are electrically controlled by a timer 31 so as to operate the inflatable boot elements 17.

The distributor valves 27 and 29 are preferably of a type such as disclosed and claimed in the aforenoted U. S. Patent No. 2,515,519 and the timer 31 may be of the type disclosed and claimed in U. S. Patent No. 2,444,210, granted June 29, 1948, to John W. Lauricella and assigned to Bendix Aviation Corporation. The timer 31 is electrically connected through suitable electrical cables 32 and 34 to the solenoid operated distributor valves 27 and 29 respectively. The operation of the timer 31 is described in detail in U. S. Patent No. 2,444,210.

Each distributor valve 27 and 29 incorporates a pressure inlet port leading from the pressure manifold 21; a suction outlet port connected by a conduit 35 to a suitable source of suction as explained hereafter; two distributor ports connected by conductors 37 to the respective inflatable elements or boots 17 controlled thereby; an exhaust port 39 leading to atmosphere; and suitable valve mechanism for selectively connecting the pressure conduit 21 and suction conduit 35 to the distributor conduits 37, as heretofore described in detail in the aforenoted U. S. Patent No. 2,515,519.

Thus, the distributor valves 27 and 29 serve to selectively connect the boots 17 to negative and positive operating pressures as controlled by the timer 31. Air under pressure in the boots 17 upon termination of the inflation period may be dumped overboard through operation of the distributor valves 27 and 29 under control of the timer 31 as explained in the aforenoted U. S. Patents Nos. 2,515,519 and 2,444,210.

The distributor valves 27 and 29 are preferably of the type disclosed and claimed in the Lawrence et al. U. S. Patent No. 2,515,519 and normally function so as to cause suction or negative pressure to be applied to the boots 17 for hold-down during normal flight operation. However, when the solenoid in the distributor valves 27 and 29 is energized by the electronic timer 31, as explained in the aforenoted Patent No. 2,515,519, the solenoid effects movement of a suitable valve mechanism for closing the connection of the conduit 37 leading to the inlet of the boot to the suction conduit 35 and opening the conduit 37 to the pressure conduit 21, thereby allowing the boot 17 to fully inflate for a predetermined interval of time. This interval is controlled by the electronic timer 31. At the termination of the interval of inflation the solenoid is deenergized by operation of the timer 31 so that air under pressure applied through the distributor valve from the pressure conduit 21 to the distributor conduit 37 is cut off while opening the conduit 37 to a discharge conduit 39 leading to atmosphere. The air in the inflated boot 17 then discharges out of the boot 17 through conduit 37, the distributor valve mechanism and the discharge conduit 39 to the atmosphere until the pressure in the boot reaches a predetermined value of approximately one inch Hg, at which time the boot is connected by suitable mechanism in the distributor valve through conduit 37 to the suction conduit 35 whereupon the remaining air is evacuated, and the boot 17 is again held down by suction applied through conduit 35.

The source of suction or negative pressure for the conduit 35 is provided by an air ejector mechanism 40 shown in detail in Figure 2, and having a conduit 42 connected to the outlet of the engine compressor 7 to bleed air from the outlet of the compressor under pressure which flows at high velocity through ejector mechanism 40 to an outlet conduit 44. The outlet conduit 44 may be exhausted directly to atmosphere or the conduit may be operatively connected to suitable air driven instruments of the aircraft requiring a constant flow of air for operation such as an air driven gyro.

As shown in Figure 2, the air ejector mechanism 40 includes a venturi nozzle 45 having a high pressure side 46 and a channel 47 at a low pressure side of the nozzle 45 from which there leads a conduit 35. Thus air under pressure of the engine compressor 7 flows in the direction of the arrows through conduit 42, nozzle 45 and conduit 44 of the air ejector mechanism 40 at a high velocity so as to entrain or draw the air from the low pressure channel 47 and apply a negative pressure through conduit 35 to normally exhaust and hold the inflatable elements or boots 17 of the aircraft under suction in a deflated condition during normal flight operation of the aircraft or missile.

It will be seen from the foregoing that there has been provided a novel combination of means for providing the operating pressures for the inflatable ice eliminating system and which arrangement is particularly adapted for use with a turbo-jet engine of an aircraft or missile.

Although only one embodiment of the invention has been illustrated and described, various changes in the form and relative arrangement of the parts may be made to suit requirements.

What is claimed is:
1. In an aircraft having an inflatable element on an airfoil surface thereof and an engine; the combination comprising an air distributor valve for controlling application of a low and a high air pressure to selectively deflate and inflate said element, an air compressor having an air inlet and an air outlet for supplying air to the engine, a first air conduit leading from the outlet of the compressor to said distributor valve to apply high air pressure through said valve to said element for selectively inflating said element, an air ejector mechanism, a second independent air conduit leading directly to the ejector mechanism from the outlet of the compressor for continuously supplying a flow of air through the ejector mechanism during normal flight operation of the aircraft, said ejector mechanism including a venturi nozzle having a high air pressure side and a low air pressure side, a third air conduit leading from the distributor valve to the low air pressure side of the venturi nozzle to apply low air pressure through said distributor valve to said element for selectively holding the inflatable element in a deflated condition.

2. For use with a plurality of inflatable units of an ice eliminating system for an aircraft having an engine; the combination comprising a plurality of distributor valves for controlling application of a fluid pressure medium so as to selectively inflate and deflate said units, a compressor having an air inlet and an air outlet for supplying air to the engine, an air conduit leading from the outlet of the compressor to said distributor valves for effecting through said valves the selective inflation of said units, an air ejector mechanism, another separate air conduit leading directly to the ejector mechanism from the outlet of the compressor for continuously supplying a flow of air at high velocity under pressure of the compressor through the ejector mechanism during normal flight operation of the air craft, said ejector mechanism including a venturi nozzle having a high air pressure side and a low air pressure side, a suction conduit leading from the low air pressure side of the venturi nozzle to the distributor valves for effecting through said distributor valves the selective application of low air pressure to said units from the low pressure side of the venturi nozzle so as to hold the selected unit in a deflated condition during the selective inflation of other of said units.

References Cited in the file of this patent
UNITED STATES PATENTS

| | | |
|---|---|---|
| 2,085,761 | Lysholm | July 6, 1937 |
| 2,217,299 | Taylor | Oct. 8, 1940 |
| 2,327,046 | Hunter | Aug. 17, 1943 |
| 2,337,426 | Taylor et al. | Dec. 21, 1943 |
| 2,399,046 | Larrecq | Apr. 23, 1946 |
| 2,515,519 | Lawrence et al. | July 18, 1950 |